(12) United States Patent
Abdelaziz et al.

(10) Patent No.: US 9,843,629 B2
(45) Date of Patent: Dec. 12, 2017

(54) SYSTEM AND METHOD FOR PROTOCOL SUPPORT IN A MULTITENANT APPLICATION SERVER ENVIRONMENT

(71) Applicant: ORACLE INTERNATIONAL CORPORATION, Redwood Shores, CA (US)

(72) Inventors: Mohamed Abdelaziz, Santa Clara, CA (US); Prashant Agarwal, San Jose, CA (US); Sindhu Subramanyam, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 264 days.

(21) Appl. No.: 14/866,618

(22) Filed: Sep. 25, 2015

(65) Prior Publication Data

US 2016/0094627 A1  Mar. 31, 2016

Related U.S. Application Data

(60) Provisional application No. 62/056,447, filed on Sep. 26, 2014.

(51) Int. Cl.
*G06F 15/173* (2006.01)
*H04L 29/08* (2006.01)
(Continued)

(52) U.S. Cl.
CPC ............... *H04L 67/10* (2013.01); *G06F 9/54* (2013.01); *H04L 67/1027* (2013.01); *H04L 67/42* (2013.01)

(58) Field of Classification Search
CPC .. H04L 67/10–67/1002; G06F 9/45504; G06F 9/45558–9/45595
See application file for complete search history.

(56) References Cited

U.S. PATENT DOCUMENTS 8,069,447 B2 * 11/2011 Jacobs .................... G06F 9/465
                                                        709/202
8,935,427 B2 *  1/2015 Outhred ............. H04L 12/4641
                                                        709/244

(Continued)

OTHER PUBLICATIONS

European Patent Office, International Searching Authority, International Search Report and Written Opinion dated April 24, 2015 for International Application No. PCT/US2015/012268 , 10 Pages.

*Primary Examiner* — Brendan Higa
(74) *Attorney, Agent, or Firm* — Tucker Ellis LLP (57) ABSTRACT

In accordance with an embodiment, described herein is a system and method for supporting an object-based stateful protocol (for example, T3 protocol) in a multitenant application server environment. The system includes a domain with a plurality of server instances, and a plurality of partitions thereon, wherein two or more partitions can spread across a first server instance and a second server instance of the plurality of server instances. Each of the first and second server instances can include a single remote java virtual machine (RJVM) that manages connections established through a single server channel on that server instance using the object-based stateful protocol. The application server instance initiating the connections can associate each connection with a particular partition using a token, and use a smart stub to recover a failed connection. A standalone Java application can similarly initiate connections to an application server instance.

20 Claims, 9 Drawing Sheets

(51) Int. Cl.
  *H04L 29/06* (2006.01)
  *G06F 9/54* (2006.01)

(56) References Cited

U.S. PATENT DOCUMENTS

2011/0213870 A1   9/2011   Cai
2012/0072597 A1   3/2012   Teather
2012/0110566 A1   5/2012   Park \* cited by examiner

SYSTEM AND METHOD FOR PROTOCOL SUPPORT IN A MULTITENANT APPLICATION SERVER ENVIRONMENT

CLAIM OF PRIORITY AND CROSS-REFERENCE TO RELATED APPLICATIONS

This application claims the benefit of priority to U.S. Provisional Application titled "SYSTEM AND METHOD FOR SUPPORTING T3 PROTOCOL IN A MULTI-TENANT APPLICATION SERVER ENVIRONMENT", Application No. 62/056,447, filed Sep. 26, 2014; and is related to U.S. patent application titled "SYSTEM AND METHOD FOR SUPPORTING MULTI-TENANCY IN A APPLICATION SERVER, CLOUD, OR OTHER ENVIRONMENT", application Ser. No. 14/601,883, filed Jan. 21, 2015; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application servers and cloud environments, and are particularly related to a system and method for supporting T3 protocol in a multitenant application server environment.

BACKGROUND

Software application servers, examples of which include Oracle WebLogic Server (WLS) and Glassfish, generally provide a managed environment for running enterprise software applications. Recently, technologies have also been developed for use in a cloud environment, which allow users or tenants to develop and run their applications within the cloud environment, and to take advantage of distributed resources provided by the environment. As such, communication protocols used for transporting data between server instances in a traditional application server environment may have to be modified for such a cloud environment.

SUMMARY

In accordance with an embodiment, described herein is a system and method for supporting an object-based stateful protocol (for example, T3 protocol) in a multitenant application server environment. The system includes a domain with a plurality of server instances, and a plurality of partitions thereon, wherein two or more partitions can spread across a first server instance and a second server instance of the plurality of server instances. Each of the first and second server instances can include a single remote Java virtual machine (RJVM) that manages connections established through a single server channel on that server instance using the object-based stateful protocol. The application server instance initiating the connections can associate each connection with a particular partition using a token, and use a smart stub to recover a failed connection. A standalone Java application can similarly initiate connections to an application server instance.

DETAILED DESCRIPTION

In accordance with an embodiment, described herein is a system and method for supporting an object-based stateful protocol (for example, T3 protocol) in a multitenant application server environment. The system includes a domain with a plurality of server instances, and a plurality of partitions thereon, wherein two or more partitions are spread across a first server instance and a second server instance of the plurality of server instances. Each of the first and second server instances includes a single remote Java virtual machine (RJVM) that manages connections established through a single server channel on that server instance using the object-based stateful protocol. A client application initiating the connections can associate each connection with a particular partition using a token, and use a smart stub to recover a failed connection.

Application Server (e.g., Multi-Tenant, MT) Environment

Figure 1:
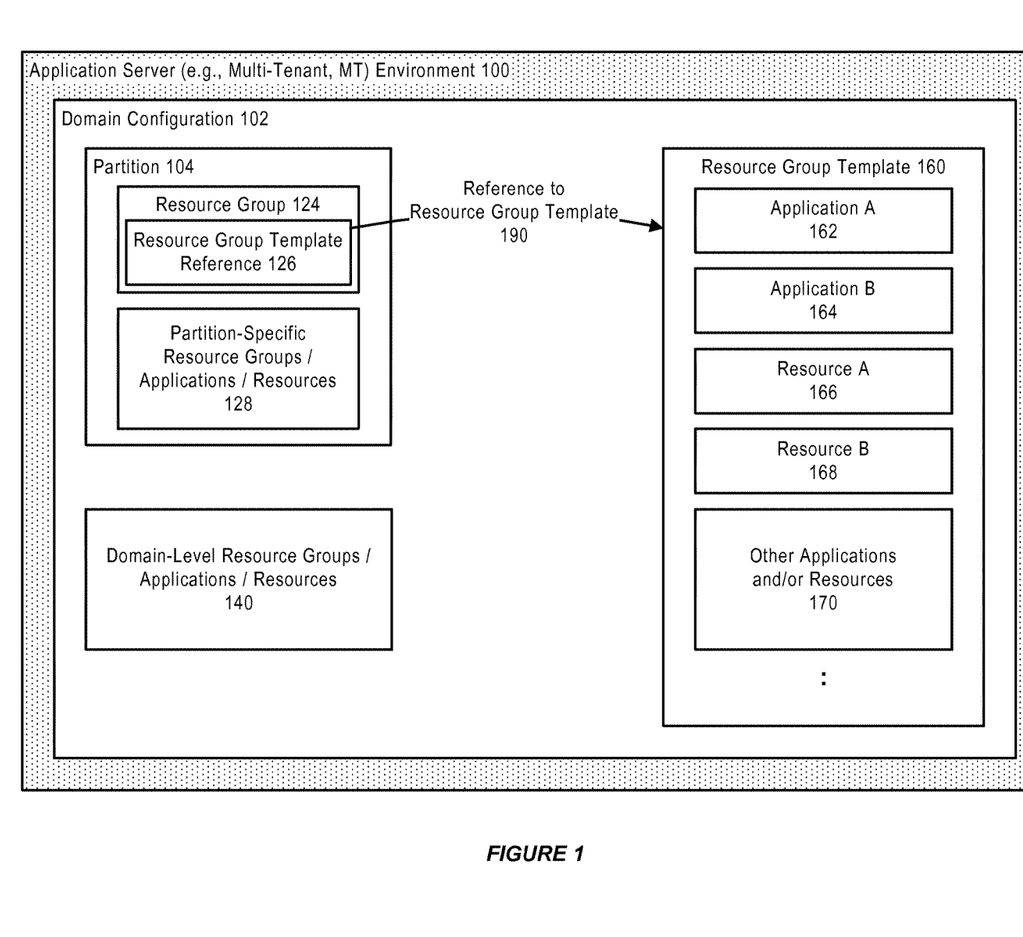
FIG. 1 illustrates a system for supporting multi-tenancy in an application server, cloud, or other environment, in accordance with an embodiment.

FIG. 1 illustrates a system for supporting multi-tenancy in an application server, cloud, or other environment, in accordance with an embodiment.

As illustrated in FIG. 1, in accordance with an embodiment, an application server (e.g., multi-tenant, MT) environment 100, or other computing environment which enables the deployment and execution of software applications, can be configured to include and operate according to a domain 102 configuration that is used at runtime to define an application server domain.

In accordance with an embodiment, the application server can include one or more partitions 104 that are defined for use at runtime. Each partition can be associated with a globally unique partition identifier (ID) and partition configuration, and can further include one or more resource groups 124, together with a reference to a resource group template 126 and/or partition-specific applications or resources 128. Domain-level resource groups, applications and/or resources 140 can also be defined at the domain level, optionally with a reference to a resource group template.

Each resource group template 160 can define one or more applications A 162, B 164, resources A 166, B 168, and/or other deployable applications or resources 170, and can be referenced by a resource group. For example, as illustrated in FIG. 1, resource group 124 in partition 104 can reference 190 resource group template 160.

Generally, a system administrator can define partitions, domain-level resource groups and resource group templates, and security realms; while a partition administrator can define aspects of their own partition, for example, by creating partition-level resource groups, deploying applications to the partition, or referencing specific realms for the partition.

Figure 2:
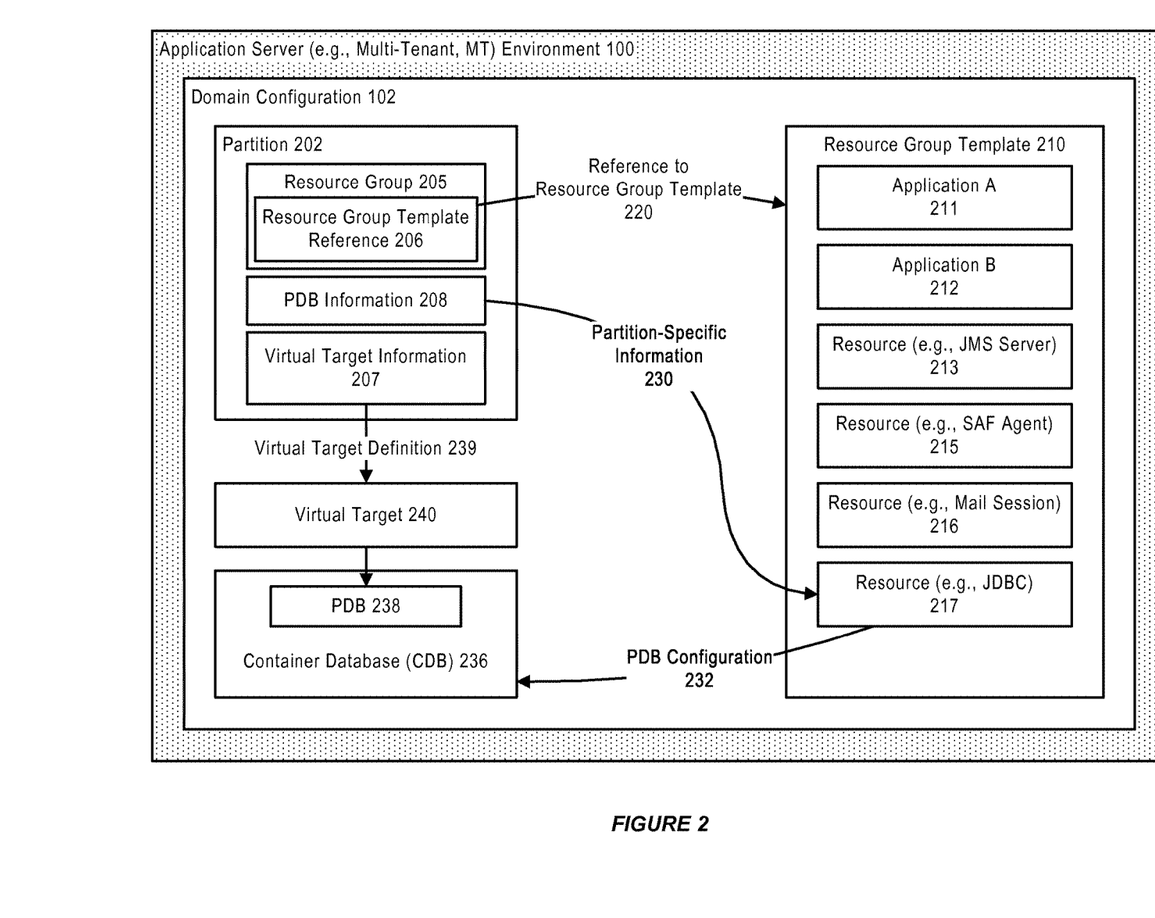
FIG. 2 further illustrates a system for supporting multi-tenancy in an application server, cloud, or other environment, in accordance with an embodiment.

FIG. 2 further illustrates a system for supporting multi-tenancy in an application server, cloud, or other environment, in accordance with an embodiment.

As illustrated in FIG. 2, in accordance with an embodiment, a partition 202 can include, for example, a resource group 205 which includes a reference 206 to a resource group template 210, a virtual target (e.g., virtual host) information 207, and a pluggable database (PDB) information 208. A resource group template (e.g., 210) can define, for example, a plurality of applications A 211 and B 212, together with resources such as a Java Message Server (JMS) server 213, store-and-forward (SAF) agent 215, mail session component 216, or Java Database Connectivity (JDBC) resource 217.

The resource group template illustrated in FIG. 2 is provided by way of example; in accordance with other embodiments, different types of resource group templates and elements can be provided.

In accordance with an embodiment, when a resource group within a partition (e.g., 202) references 220 a particular resource group template (e.g., 210), information associated with a particular partition can be used in combination with the referenced resource group template, to indicate a partition-specific information 230, for example a partition-specific PDB information. The partition-specific information can then be used by the application server to configure resources, for example a PDB resource, for use by the partition. For example, partition-specific PDB information associated with partition 202 can be used, by the application server, to configure 232 a container database (CDB) 236 with an appropriate PDB 238, for use by that partition.

Similarly, in accordance with an embodiment, a virtual target information associated with a particular partition can be used to define 239 a partition-specific virtual target 240, for use by the partition, e.g., baylandurgentcare.com, which can then be made accessible via a uniform resource locator (URL), e.g., http://baylandurgentcare.com.

Figure 3:
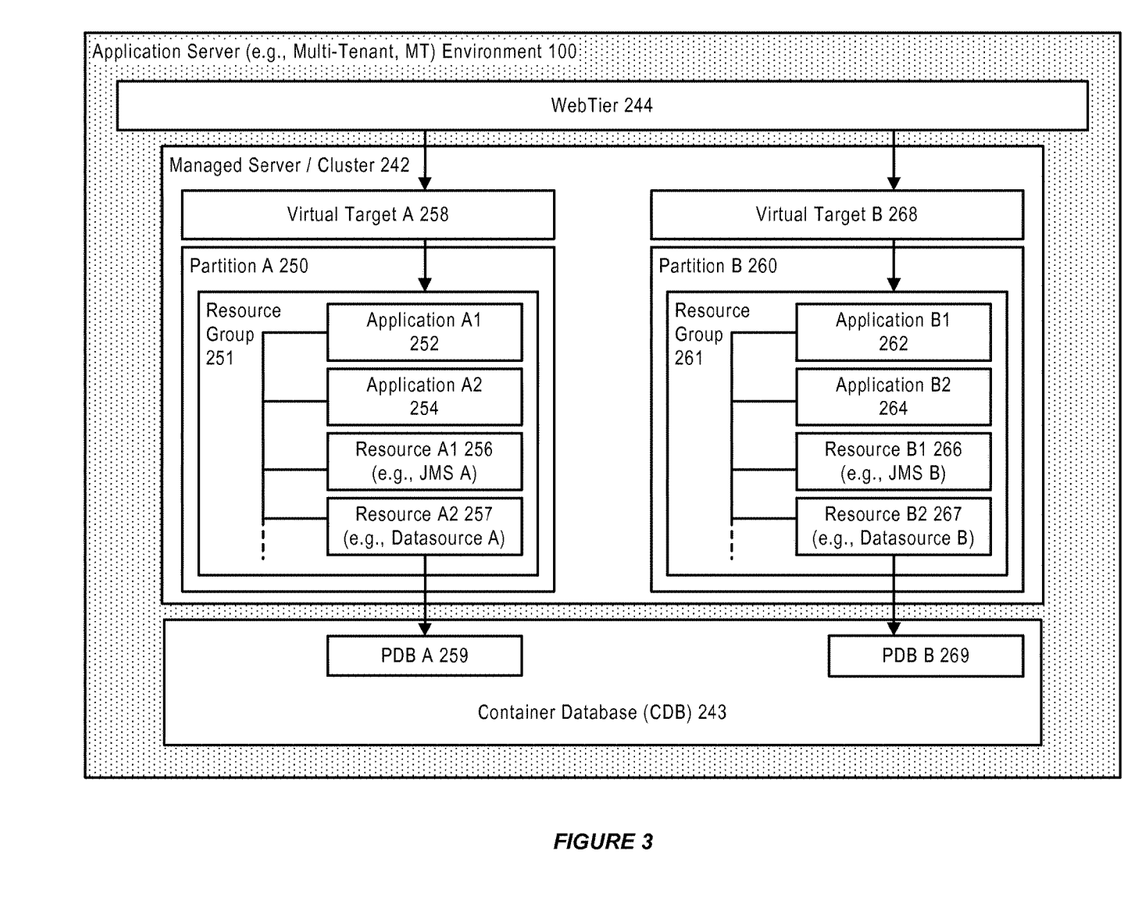
FIG. 3 further illustrates a system for supporting multi-tenancy in an application server, cloud, or other environment, in accordance with an embodiment.

FIG. 3 further illustrates a system for supporting multi-tenancy in an application server, cloud, or other environment, in accordance with an embodiment.

In accordance with an embodiment, a system configuration such as a config.xml configuration file, is used to define a partition, including configuration elements for resource groups associated with that partition, and/or other partition properties. Values can be specified per-partition using property name/value pairs.

In accordance with an embodiment, a plurality of partitions can be executed within a managed server/cluster 242, or a similar environment which can provide access to a CDB 243, and which are accessible via a web tier 244. This allows, for example, a domain or partition to be associated with one or more of the PDBs (of the CDB).

In accordance with an embodiment, each of the plurality of partitions, in this example partition A 250 and partition B 260, can be configured to include a plurality of resources associated with that partition. For example, partition A can be configured to include a resource group 251 which contains an application A1 252, application A2 254, and JMS A 256, together with a datasource A 257 associated with PDB A 259, wherein the partition is accessible via a virtual target A 258. Similarly, partition B 260 can be configured to include a resource group 261 which contains an application B1 262, application B2 264, and JMS B 266, together with a datasource B 267 associated with PDB B 269, wherein the partition is accessible via a virtual target B 268.

While several of the above examples illustrate use of CDB and PDBs, in accordance with other embodiments, other types of multi-tenant or non-multi-tenant databases can be supported, wherein a particular configuration can be provided for each partition, for example through the use of schemas, or the use of different databases.

Resources

In accordance with an embodiment, a resource is a system resource, application, or other resource or object that can be deployed to a domain of the environment. For example, in accordance with an embodiment, a resource can be an application, JMS, JDBC, JavaMail, WLDF, data source, or other system resource or other type of object that can be deployed to a server, cluster, or other application server target.

Partitions

In accordance with an embodiment, a partition is a runtime and administrative subdivision or slice of a domain that can be associated with a partition identifier (ID) and configuration, and can contain applications and/or refer to domain-wide resources through the use of resource groups and resource group templates.

Generally, a partition can contain its own applications, refer to domain wide applications via resource group templates, and have its own configuration. Partitionable entities can include resources, for example JMS, JDBC, JavaMail, WLDF resources, and other components, such as JNDI namespace, network traffic, work managers, and security policies and realms. In the context of a multi-tenant environment, the system can be configured to provide tenant access to the administrative and runtime aspects of partitions associated with a tenant.

In accordance with an embodiment, each resource group within a partition can optionally reference a resource group template. A partition can have multiple resource groups, and each of them can reference a resource group template. Each partition can define properties for configuration data that is not specified in the resource group templates to which the partition's resource groups refer. This enables the partition to act as a binding of deployable resources defined in a resource group template, to specific values for use with that partition. In some cases, a partition can override configuration information specified by a resource group template.

In accordance with an embodiment, a partition configuration, as defined for example by a config.xml configuration file, can include a plurality of configuration elements, for example: "partition", which contains the attributes and child elements that define the partition; "resource-group", which contains the applications and resources deployed to the partition; "resource-group-template", which contains applications and resources defined by that template; "jdbc-system-resource-override", which contains a database-specific service name, user name, and password; and "partition-properties", which contains property key values that can be used for macro replacement in resource group templates.

Upon startup, the system can use the information provided by the configuration file to generate partition-specific configuration elements for each resource, from the resource group template.

Resource Groups

In accordance with an embodiment, a resource group is a named, fully-qualified collection of deployable resources that can be defined either at a domain or partition level, and can reference a resource group template. The resources in a resource group are considered fully-qualified in that the administrator has provided all of the information needed to start or connect to those resources, for example the credentials for connecting to a data source, or the targeting information for an application.

A system administrator can declare resource groups at the domain level, or at the partition level. At the domain level, a resource group provides a convenient way to group related resources. The system can manage resources declared in a domain-level resource group the same as ungrouped resources, so that the resources can be started during system start-up, and stopped during system shut-down. An administrator can also stop, start, or remove a resource in a group individually, and can act on all the resources in a group implicitly by operating on the group. For example, stopping a resource group stops all of the resources in the group that are not already stopped; starting the resource group starts any resources in the group that are not already started; and removing the resource group removes all of the resources contained in the group.

At the partition level, a system or partition administrator can configure zero or more resource groups in a partition, subject to any security restrictions. For example, in a SaaS use case, various partition-level resource groups can refer to domain-level resource group templates; while in a PaaS use case, partition-level resource groups can be created that do not refer to resource group templates, but instead represent applications and their related resources that are to be made available within that partition only.

In accordance with an embodiment, resource grouping can be used to group together applications and the resources they use as a distinct administrative unit within the domain. For example, in the medical records (MedRec) application described below, a resource grouping defines the MedRec application and its resources. Multiple partitions can run the same MedRec resource group, each using a partition-specific configuration information, such that the applications that are part of each MedRec instance are made specific to each partition.

Resource Group Templates

In accordance with an embodiment, a resource group template is a collection of deployable resources that are defined at a domain level, that can be referenced from a resource group, and some of the information required to activate its resources may not be stored as part of the template itself, such that it supports the specification of partition level configuration. A domain can contain any number of resource group templates, each of which can include, for example, one or more related Java applications and the resources on which those applications depend. Some of the information about such resources may be the same across all partitions, while other information may vary from one partition to the next. Not all configuration need be specified at the domain level—partition level configuration can instead be specified in the resource group template through the use of macros, or property name/value pairs.

In accordance with an embodiment, a particular resource group template can be referenced by one or more resource groups. Generally, within any given partition, a resource group template can be referenced by one resource group at a time, i.e., not simultaneously by multiple resource groups within the same partition; however, it can be referenced at the same time by another resource group in a different partition. The object containing the resource group, e.g., the domain or partition, can use property name/value assignments to set the value of any tokens in the resource group template. When the system activates a resource group template using a referencing resource group, it can replace those tokens with values set in the resource group's containing object. In some cases, the system can also use statically-configured resource group templates and partitions to generate runtime configuration for each partition/template combination.

For example, in a SaaS use case, the system can activate the same applications and resources multiple times, including once for each partition that will use them. When an administrator defines a resource group template they can use tokens to represent the information that will be supplied elsewhere. For example, the username to use in connecting to a CRM-related data resource can be indicated in the resource group template as \${CRMDataUsername}.

Tenants

In accordance with an embodiment, in a multi-tenant environment, such as a multi-tenant (MT) application server environment, a tenant is an entity that can be represented by, or otherwise associated with, one or more partitions and/or one or more tenant-aware applications.

For example, tenants can represent distinct user organizations, such as different external companies, or different departments within a particular enterprise (e.g., HR and Finance departments), each of which can be associated with a different partition. A tenant globally unique identity (tenant ID) is the association of a particular user, at a particular moment in time, with a particular tenant. The system can derive which tenant a particular user belongs to from the user identity, for example by referring to a user identity store. The user identity enables the system to enforce those actions that a user is authorized to perform, including, but not limited to, which tenant the user may belong.

In accordance with an embodiment, the system enables isolation of the administration and runtime of different tenants from each other. For example, tenants can configure some behaviors of their applications, and resources to which they have access. The system can ensure that a particular tenant cannot administer artifacts belonging to another tenant; and, at runtime, that the applications working on behalf of a particular tenant refer only to resources associated with that tenant, and not to resources associated with other tenants.

In accordance with an embodiment, a tenant—unaware application is one that contains no logic dealing with tenants explicitly, such that any resources that the application uses may be accessible regardless of what user submitted a request to which the application is responding. In contrast, a tenant-aware application includes logic that explicitly deals with tenants. For example, based on a user's identity the application can derive the tenant to which the user belongs and use that information to access tenant—specific resources.

In accordance with an embodiment, the system enables users to deploy applications that are explicitly written to be tenant-aware, so that application developers can obtain the tenant ID of a current tenant. The tenant-aware application can then use the tenant ID to handle multiple tenants that are using a single instance of the application.

For example, the MedRec application, which supports a single doctor's office or hospital, can be exposed to two different partitions or tenants, e.g., a Bayland Urgent Care tenant, and a Valley Health tenant, each of which is able to access separate tenant-specific resources, such as separate PDBs, without changing the underlying application code.

Exemplary Domain Configuration and Multi-Tenant Environment

In accordance with an embodiment, applications can be deployed to a resource group template at the domain level, or to a resource group that is scoped to a partition or scoped to the domain. Application configuration can be overridden using deployment plans specified per-application, or per-partition.

Figure 4:
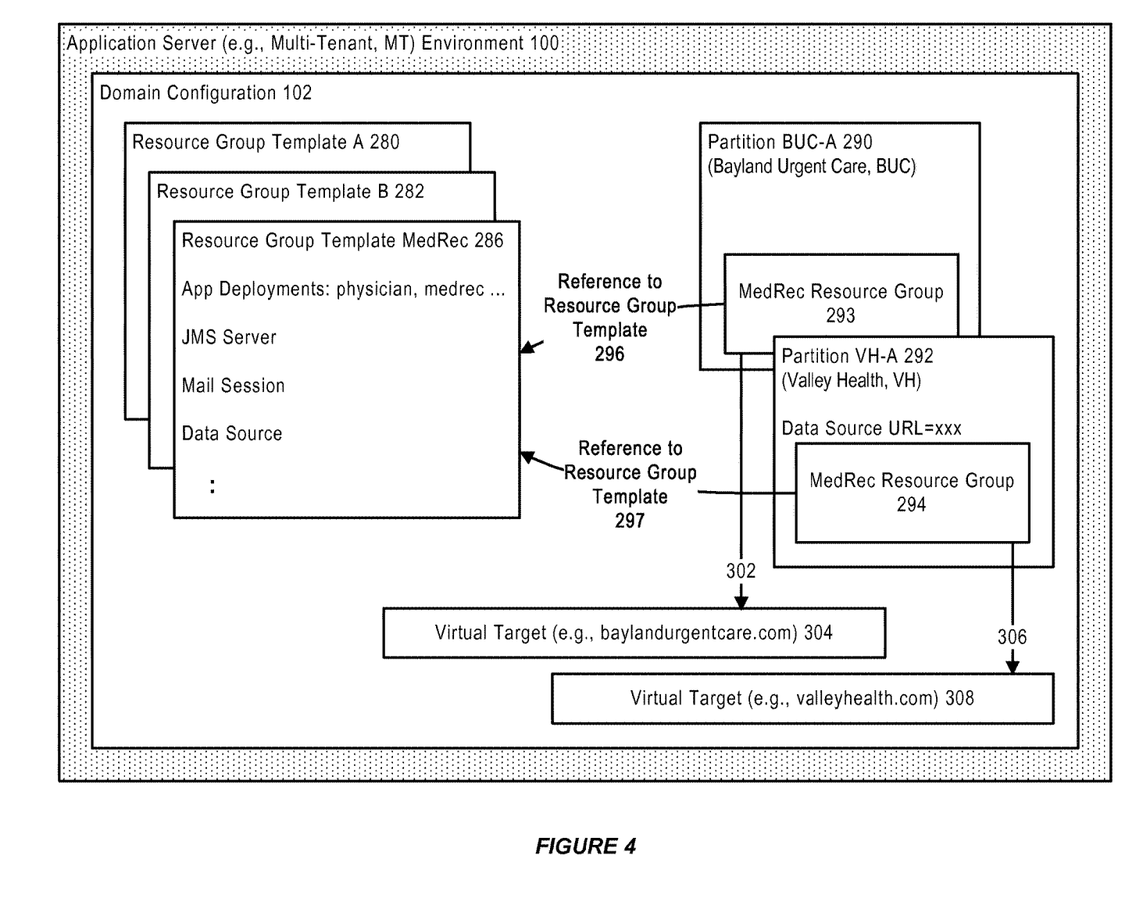
FIG. 4 illustrates a domain configuration for use with an exemplary multi-tenant environment, in accordance with an embodiment.

FIG. 4 illustrates a domain configuration for use with an exemplary multi-tenant environment, in accordance with an embodiment.

In accordance with an embodiment, when the system starts a partition, it creates virtual targets (e.g., virtual hosts) and connection pools, including one for each partition, to respective database instances, according to the provided configuration.

Typically, each resource group template can include one or more related applications and the resources on which those applications depend. Each partition can provide configuration data that is not specified in the resource group templates to which it refers, by providing a binding of the deployable resources in resource group templates to specific values associated with the partition; including, in some cases, overriding certain configuration information specified by the resource group template. This enables the system to activate an application represented by a resource group template differently for each partition, using the property values each partition has defined.

In some instances, a partition may contain resource groups that do not refer to resource group templates, or that directly define their own partition-scoped deployable resources. Applications and data sources that are defined within a partition are generally available only to that partition. Resources can be deployed so that they can be accessed from across partitions using partition:<partitionName>/<resource JNDI name>, or domain:<resource JNDI name>.

For example, a MedRec application can include a plurality of Java applications, a data source, a JMS server, and a mail session. To run the MedRec application for multiple tenants, the system administrator can define a single MedRec resource group template 286, declaring those deployable resources in the template.

In contrast to domain-level deployable resources, the deployable resources declared in a resource group template may not be fully configured in the template, or cannot be activated as-is, since they lack some configuration information.

For example, the MedRec resource group template may declare a data source used by the applications, but it may not specify a URL for connecting to the database. Partitions associated with different tenants, for example, partition BUC-A 290 (Bayland Urgent Care, BUC) and partition VH-A 292 (Valley Health, VH) can reference one or more resource group templates, by each including a MedRec resource group 293, 294 that references 296, 297 the MedRec resource group template. The reference can then be used to create 302, 306, the virtual targets/virtual hosts for each tenant, including a virtual host baylandurgentcare.com 304 associated with the BUC-A partition, for use by the Bayland Urgent Care tenant; and a virtual host valleyhealth.com 308 associated with the VH-A partition, for use by the Valley Health tenant.

Figure 5:
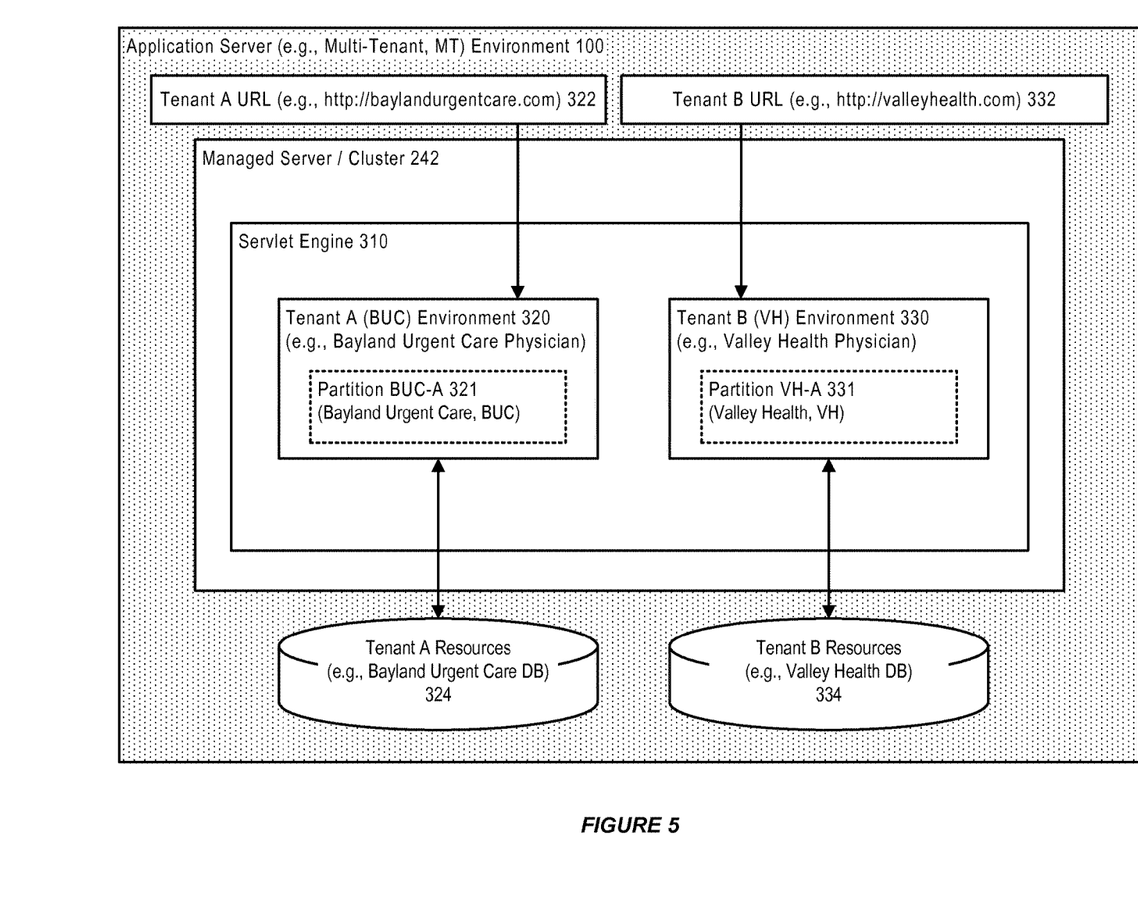
FIG. 5 further illustrates an exemplary multi-tenant environment, in accordance an embodiment.

FIG. 5 further illustrates an exemplary multi-tenant environment, in accordance with an embodiment. As illustrated in FIG. 5, and continuing the example from above, in which two partitions reference the MedRec resource group template, in accordance with an embodiment, a servlet engine 310 can be used to support a plurality of tenant environments, in this example a Bayland Urgent Care Physician tenant environment 320, and a Valley Health Physician tenant environment 330.

In accordance with an embodiment, each partition 321, 331 can define a different virtual target on which to accept incoming traffic for that tenant environment, and a different URL 322, 332 for connecting to the partition and to its resources 324, 334, including in this example either a bayland urgent care database, or a valley health database respectively. The database instances can use compatible schemas, since the same application code will execute against both databases. When the system starts the partitions, it can create the virtual targets and connection pools to the respective database instances.

Support for T3 Protocol

T3, an object-based stateful protocol, is an underlying protocol for remote method invocation (RMI) communications between an application server instance (for example, WebLogic server instance) and other Java programs, including clients and other application server instances. Periodic point-to-point "heartbeats" can be used to announce and determine continued availability between two end points of a T3 connection.

A server instance keeps track of each Java Virtual Machine (JVM) with which it connects, and creates a single T3 connection to carry all traffic for each JVM. For example, if a Java client accesses an Enterprise Bean (EJB) and a JDBC connection pool on WebLogic Server, a single network connection is established between the WebLogic Server JVM and the client JVM. The EJB and JDBC services can be written as if they had sole use of a dedicated network connection, as the T3 protocol invisibly multiplexes packets on the single connection.

In accordance with an embodiment, a remote JVM (RJVM) can be constructed on each Java program to transport data to the other Java program. Each RJVM represents a JVM on the remote peer to maintain state between the two JVMs.

Typically, an RJVM is tied to a server channel used for node-to-node communication; and, for a given server channel, there can be a single T3 connection per RJVM. As such, when a server instance is listening on multiple server channels, an equal number of RJVMs are created. Using multiple RJVMs to manage connections on a single server instance can increase resource usage and network traffic.

In a multi-tenant application server environment, a single RJVM needs to support multiple partitions for higher density of deployments. Each partition ideally should have a dedicated T3 connection, so that traffic packets can be multiplexed on the partition-specific T3 connection.

In accordance with an embodiment, described herein is a system and method for supporting an object-based stateful protocol (for example, T3 protocol) in a multitenant application server environment. The system includes a domain with a plurality of server instances, and a plurality of partitions thereon, wherein two or more partitions can spread across a first server instance and a second server instance of the plurality of server instances. Each of the first and second server instances can include a single remote java virtual machine (RJVM) that manages connections established through a single server channel on that server instance using the object-based stateful protocol. The application server instance initiating the connections can associate each connection with a particular partition using a token, and use a smart stub to recover a failed connection. A standalone Java application can similarly initiate connections to an application server instance.

In accordance with an embodiment, compared to an approach where multiple RJVMs are used in a single server instance, the above-describe approach can reduce resource usage and improve density of deployment on the server instance, while still maintaining separation of resources between partitions.

In accordance with an embodiment, under the above approach, each T3 connection is established with a provider URI specifying a particular partition, and the connection can be mapped via a partition-aware JNDI tree to the specified partition. For each connection created, a token and a smart stub can be returned to the client application, for identifying that connection for reuse, and for recovering that connection if it fails.

Single RJVM

Figure 6:
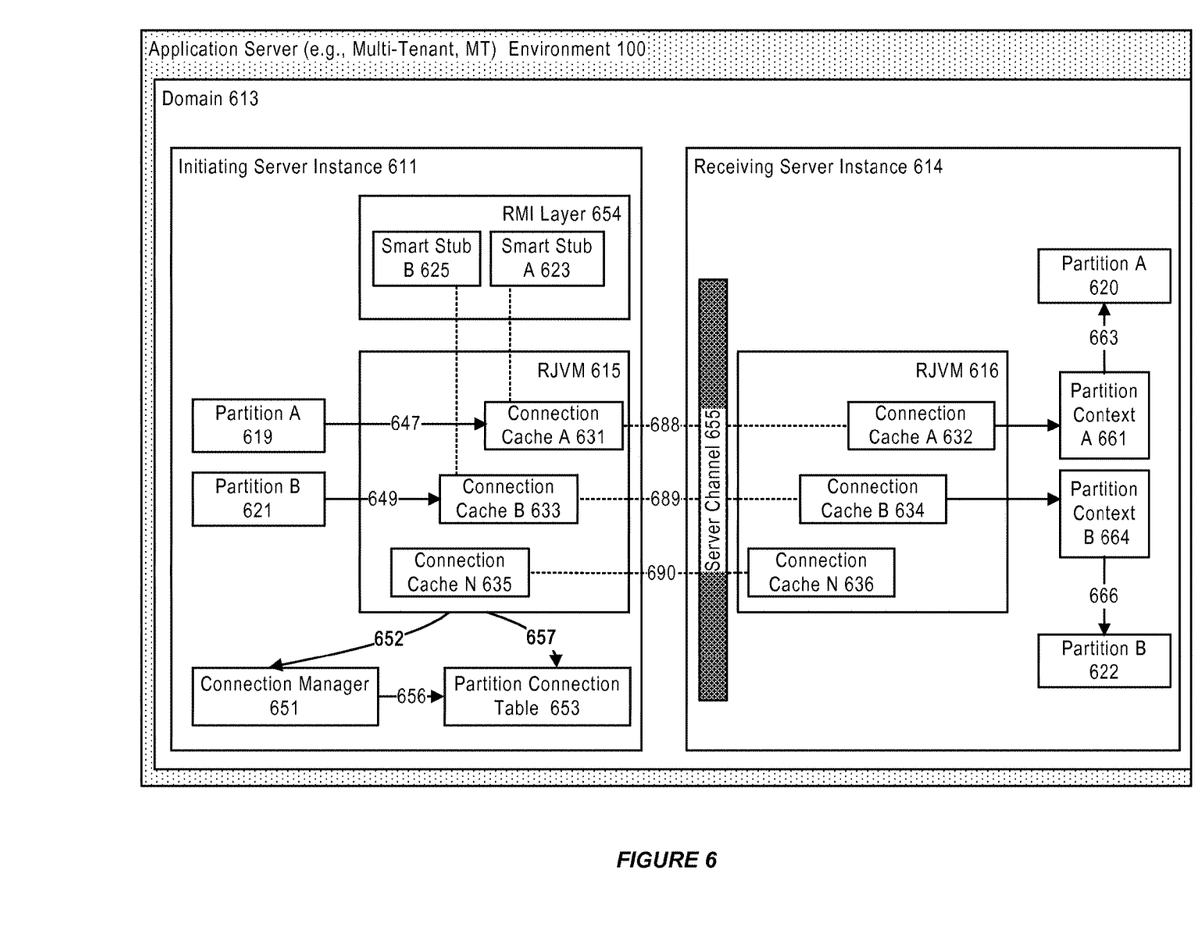
FIG. 6 illustrates a system for supporting T3 protocol in an application server, cloud, or other environment, in accordance with an embodiment.

FIG. 6 illustrates a system for supporting T3 protocol in an application server, cloud, or other environment, in accordance with an embodiment.

As shown in FIG. 6, an application domain 613 includes a plurality of application server instances (for example, initiating server instance 611 and receiving server instance B 614), and a plurality of partitions (for example, partition A and partition B), each partition can be spread across the initiating server instance and the receiving service instance, as shown by partition A 619, partition A 620, partition B 621 and partition B 622.

In accordance with an embodiment, an application in each of the partitions on the initiating server instance can initiate 647, 649 a T3 connection (for example, T3 connection A 688 and T3 connection B 689) to access resources in that partition on the receiving server instance. In addition, one or more domain-level T3 connections (for example, T3 connection N 690) can be established for use in transmitting management data, for example heartbeat messages. Management data such as heartbeat messages are per RJVM and are sent at the domain level. When a domain-level connection does not exist, one of the partition-level connections can be used to transmit the management data.

As further shown in FIG. 6, all T3 connections between the server instances are established via a single server channel 655. The server channel can be a configuration item that defines a communication endpoint of a network connection; and include a protocol type, an IP, and a port which a server instance uses for a network listener. Additional properties can include login timeout, and tunneling support.

In accordance with an embodiment, each T3 connection can be dedicated to a partition, and remain open throughout the lifetime of the partition. A closed connection may not result in a PeerGone event, unless all connections have been closed, or a server instance has been explicitly shut down.

In accordance with an embodiment, all the T3 connections between the two server instances can be managed by a single RJVM (for example, RJVM 615 or RJVM 616) on each server instance. An RJVM can be constructed at the time when a first T3 connection is established between the server instances, to represent the JVM on the remote peer.

In accordance with an embodiment, the RVJM on each server instance can maintain connection caches associated with the T3 connections. Each T3 connection can maintain its object cache, which can include an abbreviation table for optimizing on wire traffic.

For example, the RJVM on the initiating server instance can maintain connection cache A 631, connection cache B 633 and connection cache N 635, while the RJVM on the receiving server instance can maintain connection cache A 632, connection cache B 634 and connection cache N 636. Each connection cache can contain immutable objects (for example, authenticated user, method descriptor, and/or ClassTableEntry) for communication between the two server instances, so that these immutable objects can be referenced from the caches without being retransmitted each time they are used.

Listing 1 illustrates a sample interface of a RJVM in accordance with an embodiment.

Listing 1

```
public    void setUser(String partitionUrl, AuthenticatedUser
          authenticatedUser);
public    AuthenticatedUser getUser(String partitionUrl);
public    MsgAbbrevOutputStream getRequestStream(String
          partitionName) throws IOException;
public    MsgAbbrevOutputStream getRequestStream(ServerChannel
          channel,String partitionURL throws IOException;
public    MsgAbbrevOutputStream getResponseStream(ServerChannel
          channel, byte qos, String partitionName) throws IOException;
public    MsgAbbrevOutputStream
          getRequestStreamForDefaultUser(Protocol
          protocol, String partitionURL) throws IOException;
```

As shown in Listing 1, an RJVM can include methods to get data stream via a specified outbound local channel for a specified partition.

In accordance with an embodiment, the RJVM on the initiating server instance can communicate 652 with a connection manager 651, which can reference 656 a partition connection table 653, to determine if a connection for a particular partition exists before attempting to establish a new connection for the partition. Each established T3 connection can be added 657 to the partition connection table.

In accordance with an embodiment, each partition-level T3 connection can be associated with a partition context (for example, partition context A 661 or partition context B 664), and a smart stub (for example, smart stub A 623 or smart stub B 625) in an RMI layer 654. Each partition context can be a context object from which object references to other RMI objects can be obtained. For example, the partition context A can be used to access 663 objects in partition A, and the partition context B can be used to access 666 objects in partition B.

In accordance with an embodiment, each smart stub can be returned from the receiving server instance when a partition context is established, and includes information for establishing its associated connection when the receiving server instance fails. For example, the information can include server references in a cluster, which allow the failed connection to recover to another server instance in the cluster.

Figure 7:
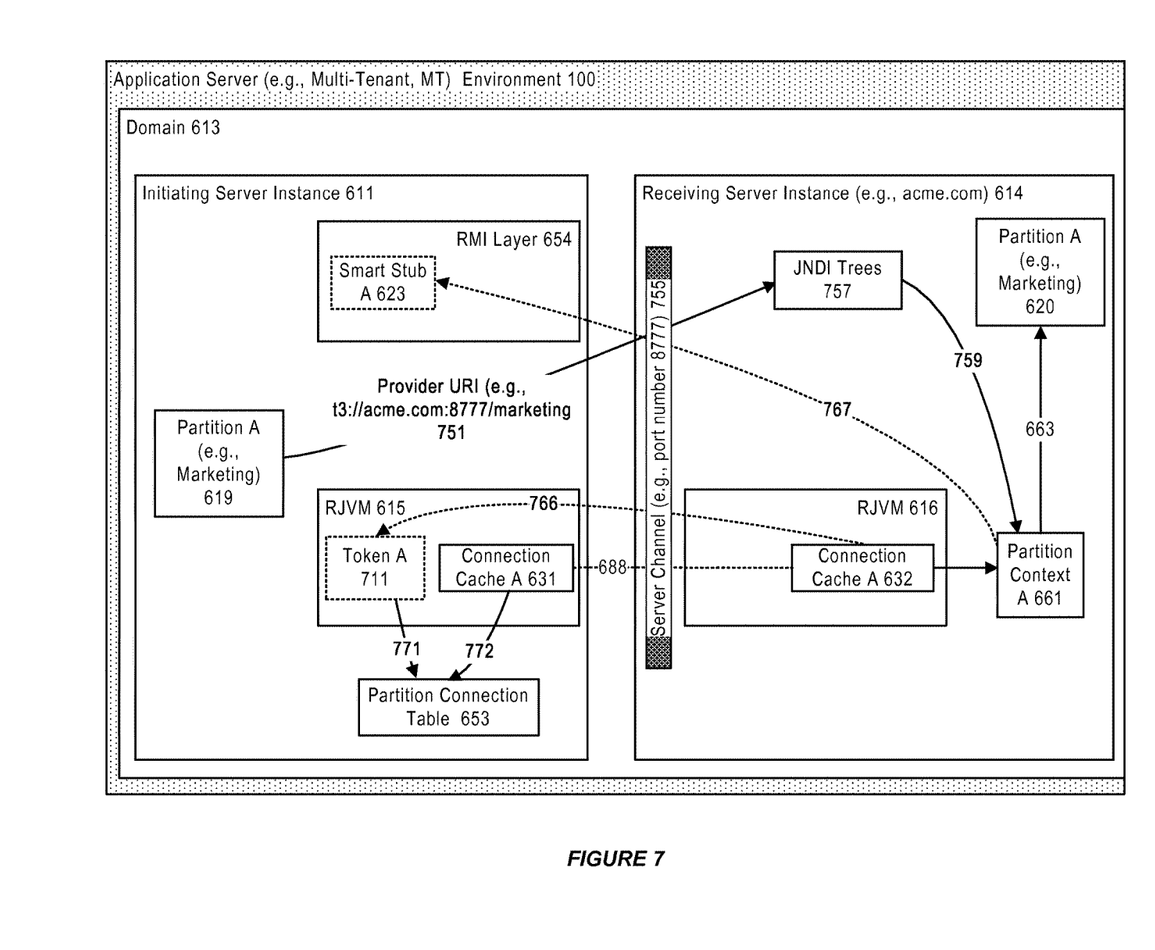
FIG. 7 further illustrates a system for supporting T3 protocol in an application server, cloud, or other environment, in accordance with an embodiment.

FIG. 7 further illustrates a system for supporting T3 protocol in an application server, cloud, or other environment, in accordance with an embodiment.

As shown in FIG. 7, a client application in partition A 619 can provide a provider URI 751 specifying a partition name (for example, "marketing") in JNDI environment properties and use the provider URI to initiate a T3 connection. A partition-aware JNDI tree 757 can be used to create 759 the partition context A.

At the T3 level, the host (e.g., acme.com) and port definition (e.g., 8777) in the provider URI can be used to establish a T3 connection to the receiving server instance through a server channel 755 using the T3 protocol. The URI can then be added as part of the T3 bootstrap protocol elements, and mapped to a partition using a partition table API on the receiving server instance. After validation of specified credentials, the established connection can be added 772 to the partition connection table.

In accordance with an embodiment, once the T3 connection is established, a token (for example, token A 711) can be returned 766 to the initiating server instance as an identifier of the established connection, and added 771 to the partition connection table, to be associated with the added connection. The token can be the name of the partition associated with the established connection.

In accordance with an embodiment, all subsequent communication within partition A between the two server instances continues on that connection within the established partition context. For each request or response via the connection, the partition name is pushed on the component invocation context and popped after the request or response has been processed. For each incoming request, the T3 protocol can identify a target partition for the request, and set the component invocation context appropriately.

In accordance with an embodiment, the smart stub A 623 can be created on the receiving server instance as a wrapper of the partition context A, and sent back 767 to the initiating server instance.

In accordance with an embodiment, if a partition context is available on the thread, the RJVM can reference the partition connection table for an existing connection prior to attempting to establish a new connection.

Failure Recovery

Figure 8:
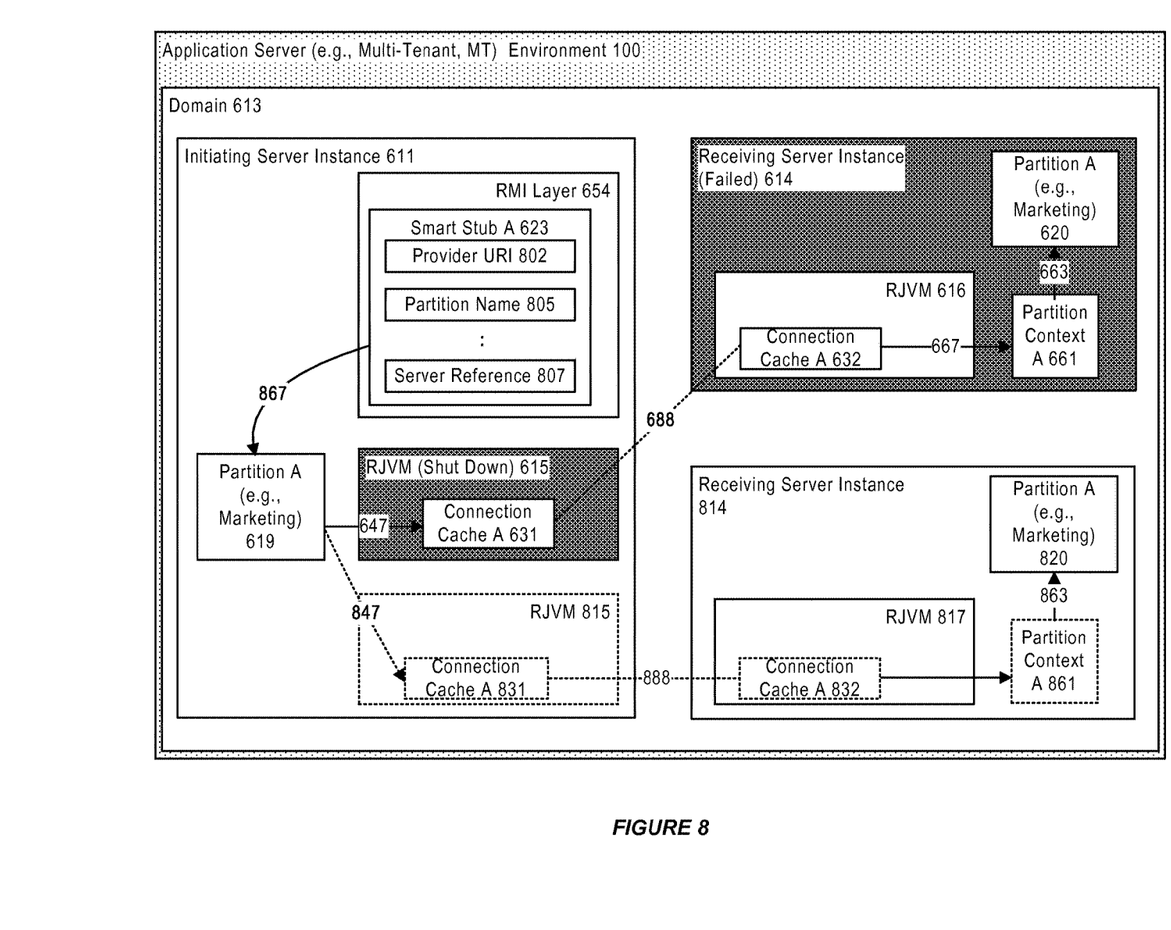
FIG. 8 further illustrates a system for supporting T3 protocol in an application server, cloud, or other environment, in accordance with an embodiment.

FIG. 8 further illustrates a system for supporting T3 protocol in an application server, cloud, or other environment, in accordance with an embodiment.

As shown in FIG. 8, the smart stub can include an original provider URI 802 used to establish the partition-specific T3 connection, a partition name 805, references to server instances 807 (e.g., RJVM ID for connecting to each referenced server instance) in a particular cluster in the domain. The server instance references in the smart stub correspond to a replica-list created at the receiving server for failover. The replica-list can include a list of RJVMs.

When a failure is detected on the T3 connection, for example when the receiving server instance fails, the RJVM 615 corresponding to the JVM on the receiving server instance can be shut down. An application in partition A on the initiating server instance can dynamically construct a connection URI using 867 the information in the smart stub, and use the connection URI to establish a new T3 connection 888 to an RJVM 817 on a different server instance (for example, receiving server instance 814), where the RJVM can maintain a connection cache A 832, and create a partition context A 861 that is associated 863 with partition A 820.

In accordance with an embodiment, when the new T3 connection is attempted, a new RJVM (for example, RVJM 815) can be created on the initiating server instance, to manage the new T3 connection, including maintaining a connection cache A 831 associated 847 with partition A on the initiating server instance.

Resource Group Migration

In accordance with an embodiment, resource group migration provides an administrator the ability to move all deployed resources from a source cluster to a target cluster without bringing server instances down. An administrator can migrate a resource group to rebalance the load, deal with outages, or perform planned maintenance. After a resource group has been migrated, the T3/RJVM layer needs to reroute requests to the resource group in the target cluster.

In accordance with an embodiment, a client can create a T3 connection using a provider URI that includes an address of a traffic director (for example, Oracle Traffic Director (OTD)). The traffic director can load balance the connection to a server instance in one of the configured clusters. All communication between the client and the server instance passes through the traffic director.

In accordance with an embodiment, when the administrator initiates migration of a resource group, the clustering layer can replicates existing sessions in the source cluster to the target cluster, while updating secondary replica references on the target cluster. The replica-list described above can be updated and piggy-backed to a client on responses to requests from the client.

In accordance with an embodiment, after a partition with the resource group on the source cluster is shut down, connections between the client and the partition are closed. New requests from the client can pass through the traffic director. When the T3 protocol is tunneled over TCP, a connection request from an inactive client associated with an existing session on the source cluster can pass through the tunnel on the traffic director, which can examine the updated replica-list from the client for appropriate partition routing.

Similarly, when the T3 protocol is tunneled over HTTP, the traffic director can inspect the header "host" parameter for appropriate partition routing.

Figure 9:
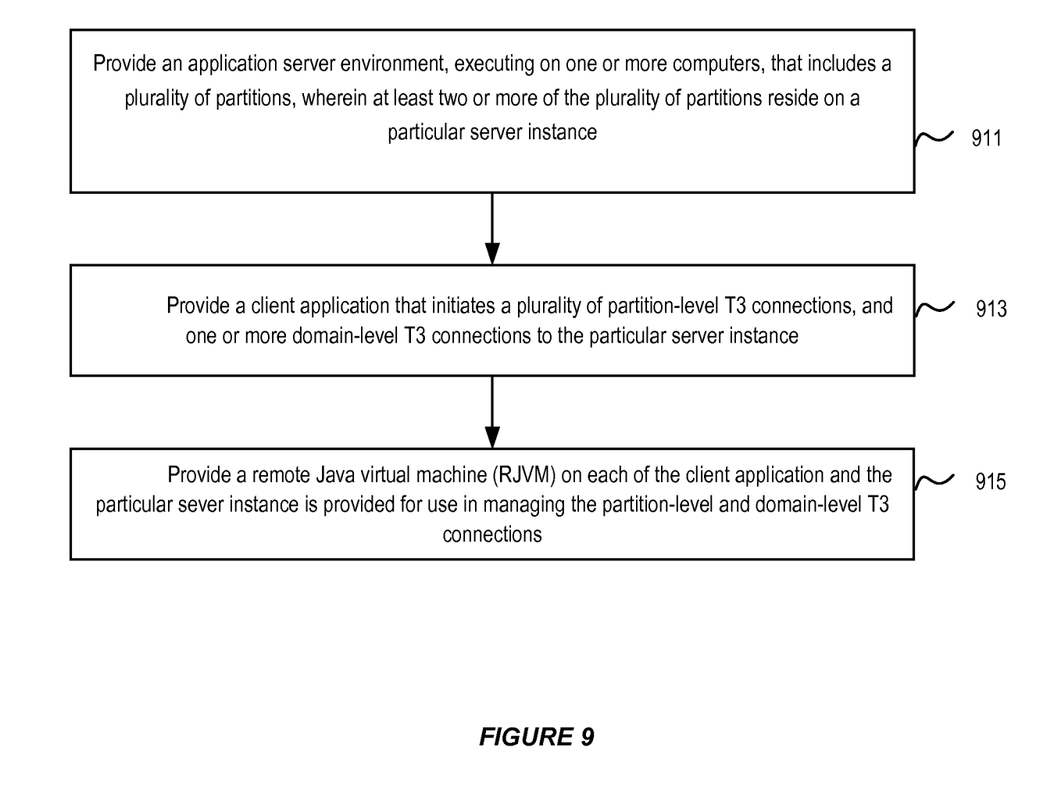
FIG. 9 illustrates a method for supporting T3 protocol in an application server, cloud, or other environment, in accordance with an embodiment.

FIG. 9 illustrates a method for supporting T3 protocol in an application server, cloud, or other environment, in accordance with an embodiment.

As shown in FIG. 9, at step 911, an application server environment, executing on one or more computers, that includes a plurality of partitions is provided, wherein at least two or more of the plurality of partitions resides on a particular server instance.

At step 913, a client application initiates a plurality of partition-level T3 connections, and one or more domain-level T3 connections to the particular server instance.

At step 915, a remote Java virtual machine (RJVM) on each of the client application and the particular sever instance is provided for use in managing the partition-level and domain-level T3 connections.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for supporting an object-based stateful protocol in a multitenant application server environment, comprising:
one or more computers, each computer including one or more microprocessors;
an application server environment executing on the one or more computers, wherein the application server environment includes a plurality of partitions, wherein at least two or more of the plurality of partitions reside on a particular server instance;
a client application that initiates a plurality of partition-level connections and one or more domain-level connections to the particular server instance using an object-based stateful protocol;
a remote Java virtual machine (RJVM) on each of the client application and the particular server instance for use in managing the partition-level and domain-level connections.

2. The system of claim 1, further comprising
a smart stub for each partition-level connection on the client application, wherein the smart stub contains a partition name and a plurality of references to server instances in a particular cluster.

3. The system of claim 1, wherein, in the event of a failure of a connection, the client application dynamically constructs a connection URI using the information in the smart stub to connect to a new server instance.

4. The system of claim 1, wherein the partition-level and domain-level connections are established through a single server channel.

5. The system of claim 1, wherein the client application is selected from a group consisting of a standalone Java application and a server instance.

6. The system of claim 1, wherein each partition-level connection is associated with a partition context that associates that connection with a partition.

7. The system of claim 1, each partition-level connection is associated with a token for use in identifying the connection.

8. The system of claim 1, wherein each connection is added to a partition connection table.

9. The system of claim 1, wherein all communications between the client application and the particular server instance pass through a traffic director in the domain.

10. The system of claim 1, further comprising a connection manager, which references a partition connection table, to determine if an existing connection for a particular connection already exists before attempting to establish a new connection for the partition.

11. The system of claim 1, wherein the object-based stateful protocol is T3protocol.

12. A method for supporting an object-based stateful protocol in a multitenant application server environment, comprising:
providing an application server environment executing on one or more computers, wherein each computer includes one or more microprocessors, wherein the application server environment includes a plurality of partitions, wherein at least two or more of the plurality of partitions reside on a particular server instance;
providing a client application that initiates a plurality of partition-level connections and one or more domain-level connections to the particular server instance using an object-based stateful protocol; and
providing a remote Java virtual machine (RJVM) on each of the client application and the particular server instance for use in managing the partition-level and domain-level connections.

13. The method of claim 12, further comprising
providing a smart stub for each partition-level connection on the client application, wherein the smart stub contains a partition name and a plurality of references to server instances in a particular cluster.

14. The method of claim 12, wherein, in the event of a failure of a connection, the client application dynamically constructs a connection URI using the information in the smart stub to connect to a new server instance.

15. The method of claim 12, wherein the partition-level and domain-level connections are established through a single server channel.

16. The method of claim 12, wherein the client application is selected from a group consisting of a standalone Java application and a server instance.

17. The method of claim 12, wherein each partition-level connections is associated with a partition context that associates that connection with a partition.

18. The method of claim 12, wherein each partition-level connection is associated with a token for use in identifying the connection.

19. The method of claim 12, wherein each connection is added to a partition connection table.

20. A non-transitory computer readable storage medium, including instructions stored thereon which when read and executed by one or more computers cause the one or more computers to perform the steps comprising:
providing an application server environment executing on the one or more computers, wherein each computer includes one or more microprocessors, wherein the application server environment includes a plurality of partitions, wherein at least two or more of the plurality of partitions reside on a particular server instance;
providing a client application that initiates a plurality of partition-level connections and one or more domain-level connections to the particular server instance using an object-based stateful protocol; and
providing a remote Java virtual machine (RJVM) on each of the client application and the particular server instance for use in managing the partition-level and domain-level connections.

* * * * *

UNITED STATES PATENT AND TRADEMARK OFFICE
CERTIFICATE OF CORRECTION

PATENT NO. : 9,843,629 B2
APPLICATION NO. : 14/866618
DATED : December 12, 2017
INVENTOR(S) : Abdelaziz et al.

Page 1 of 1

It is certified that error appears in the above-identified patent and that said Letters Patent is hereby corrected as shown below:

In the Specification

Column 10, Line 1, delete "RVJM" and insert -- RJVM --, therefor.

Column 10, Line 28, delete "channel,String" and insert -- channel, String --, therefor.

Column 11, Line 63, delete "RVJM" and insert -- RJVM --, therefor.

In the Claims

Column 14, Line 4, in Claim 11, delete "T3protocol." and insert -- T3 protocol. --, therefor.

Signed and Sealed this
Ninth Day of July, 2019

Andrei Iancu
*Director of the United States Patent and Trademark Office*